US009848449B2

(12) United States Patent
Wang

(10) Patent No.: US 9,848,449 B2
(45) Date of Patent: Dec. 19, 2017

(54) METHODS AND SYSTEMS FOR TRANSMITTING SIGNALS BETWEEN ELECTRONIC DEVICES

(71) Applicant: Noodoe Corporation, Taipei (TW)

(72) Inventor: John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 109 days.

(21) Appl. No.: 14/987,794

(22) Filed: Jan. 5, 2016

(65) Prior Publication Data

US 2016/0205708 A1 Jul. 14, 2016

(30) Foreign Application Priority Data

Jan. 12, 2015 (TW) .............................. 104100909 A

(51) Int. Cl.
| | | |
|---|---|---|
| H04L 12/28 | (2006.01) | |
| H04W 76/02 | (2009.01) | |
| H04W 8/00 | (2009.01) | |
| H04W 84/18 | (2009.01) | |

(52) U.S. Cl.
CPC .......... *H04W 76/02* (2013.01); *H04W 8/005* (2013.01); *H04W 76/023* (2013.01); *H04W 84/18* (2013.01)

(58) Field of Classification Search
CPC ... H04W 76/02; H04W 8/005; H04W 76/023; H04W 84/18
USPC ............... 370/216–254, 312–328, 338–342; 455/434–501
See application file for complete search history.

(56) References Cited

U.S. PATENT DOCUMENTS

| 7,342,895 | B2 * | 3/2008 | Serpa | H04L 29/12254 |
| | | | | 370/254 |
| 9,148,751 | B2 * | 9/2015 | Chen | H04W 4/008 |
| 9,226,119 | B2 * | 12/2015 | Suryavanshi | H04L 67/125 |
| 9,438,044 | B2 * | 9/2016 | Proud | H01F 38/14 |
| 9,451,645 | B2 * | 9/2016 | Choi | H04W 76/02 |
| 9,615,312 | B2 * | 4/2017 | Lee | H04W 48/10 |
| 2009/0017755 | A1 * | 1/2009 | Tomoda | H04W 12/06 |
| | | | | 455/41.2 |
| 2012/0142383 | A1 | 6/2012 | Velusamy et al. | |
| 2012/0196534 | A1 * | 8/2012 | Kasslin | H04W 76/002 |
| | | | | 455/41.2 |
| 2013/0102348 | A1 * | 4/2013 | Kim | H04W 4/06 |
| | | | | 455/517 |
| 2014/0188348 | A1 | 7/2014 | Gautama et al. | |
| 2014/0247145 | A1 | 9/2014 | Proud | |
| 2014/0323049 | A1 * | 10/2014 | Park | H04W 4/008 |
| | | | | 455/41.2 |

(Continued)

*Primary Examiner* — Man Phan
(74) *Attorney, Agent, or Firm* — McClure, Qualey & Rodack, LLP

(57) ABSTRACT

Methods and systems for transmitting signals between electronic devices are provided. First, a first electronic device receives an instruction, and continuously generates a specific signal according to the instruction. In some embodiments, at least one motion sensor can detect the motion of the first electronic device to generate the instruction. The first electronic device broadcasts the specific signal via a wireless network. Then, at least one secondary electronic device receives the specific signal via a wireless network. The secondary electronic device connects to the first electronic device via a wireless network, and instructs the first electronic device to stop generating the specific signal.

14 Claims, 9 Drawing Sheets

(56) References Cited

U.S. PATENT DOCUMENTS

2015/0042589 A1* 2/2015 Seo .................. G06F 21/36
                                                    345/173
2016/0278006 A1* 9/2016 Lee .................. H04W 12/00

* cited by examiner

METHODS AND SYSTEMS FOR TRANSMITTING SIGNALS BETWEEN ELECTRONIC DEVICES

BACKGROUND OF THE INVENTION

Field of the Invention

The disclosure relates generally to methods and systems for transmitting signals, and, more particularly to methods and systems that can transmit signals between electronic devices by wirelessly broadcasting signals, and optionally generate signals according to the motion of an electronic device or instruct the electronic device to stop generating signals via another electronic device.

Description of the Related Art

In the service industry, the best way to increase customer satisfaction is by directly providing appropriate and immediate services to customers. For example, when a customer needs a specific service, such as ordering food, having their water refilled, or receiving the check, the customer always raises a hand to let the waiter noticed the customer's requests. However, during busy times, it is not easy to find a waiter, or the customer's requests cannot be handled in real-time, resulting in customer dissatisfaction. Currently, wireless service bells have been deployed in some restaurants. Customers can push a service bell set on the table when they need a service. The service bell can wirelessly transmit signals to reception equipment set on a counter or it can be worn by a waiter, so that the customers' requirement can be known by the waiter without delay.

Conventionally, the service bell generates wireless signals only at the moment the service bell is pushed. The reception equipment may miss the wireless signals when any indeterminate environment or anthropic factor exists in the restaurant during the period of the generation of wireless signals. Even if the reception equipment correctly receives the wireless signals, a waiter may ignore the corresponding request since the waiter may be busy and the reception equipment cannot continuously repeat the request. Additionally, since several reception devices may simultaneously receive wireless signals generated by the service bell, a customer request may be served by several waiters, or by none, since they may assume another waiter has already handled the request. Furthermore, since there is no related tool for gathering statistics regarding execution details of the provided service, the customer satisfaction and execution effect of the wireless service bell cannot be evaluated.

On the other hand, with the coming of IOT (Internet Of Things), every type of device or object can connect to networks, and users can access and control these devices or objects via networks. Currently, wearable electronic devices have become the most tangible applications of IOT. In some cases, the wearable device can detect health information of a user, record exercise information and sleep patterns, or display email messages or incoming call notifications.

However, since there is a size limitation to wearable electronic devices, the battery capacity and battery life of these devices are high priority issues in the industry. Generally, related components of wearable electronic devices will adopt a low-power consumption technology, such that the standby time of wearable electronic devices can be extended. For example, a wearable electronic device can have a wireless connecting unit, which is implemented with a low-power consumption technology, such as Bluetooth Smart technology, for connecting with a smart phone implemented with a compatible low-power consumption technology, such as Bluetooth Smart Ready technology via wireless network. Conventionally, the low-power consumption wireless connecting unit supports two modes: central and peripheral. In the central mode, the wireless connecting unit can receive data from other wireless connecting units. In the peripheral mode, the wireless connecting unit can broadcast its data. There exists an opportunity to significantly reduce the drawbacks of prior arts, and improve customer satisfaction by integrating the wireless service bell with IOT technology.

BRIEF SUMMARY OF THE INVENTION

Methods and systems for transmitting signals between electronic devices are provided, wherein signals can be transmitted between electronic devices by wirelessly broadcasting the signals. Optionally, signals can be generated according to the motion of an electronic device or the electronic device can be instructed to stop generating signals via another electronic device.

In an embodiment of a method for transmitting signals between electronic devices, a first electronic device receives an instruction and continuously generates a specific signal according to the instruction. The first electronic device broadcasts the specific signal via a wireless network using a wireless connecting unit. Then, at least one secondary electronic device receives the specific signal via a wireless network using a wireless connecting unit. The secondary electronic device connects to the first electronic device via a wireless network, and instructs the first electronic device to stop generating the specific signal.

An embodiment of a system for transmitting signals between electronic devices comprises a first electronic device and at least one secondary electronic device. The first electronic device receives an instruction, and continuously generates a specific signal according to the instruction. The first electronic device broadcasts the specific signal via a wireless network using a wireless connecting unit. The secondary electronic device receives the specific signal via a wireless network using a wireless connecting unit. The secondary electronic device connects to the first electronic device via a wireless network, and instructs the first electronic device to stop generating the specific signal.

In some embodiments, the first electronic device comprises at least one motion sensor for detecting the motion of the first electronic device to generate the instruction.

In some embodiments, the wireless connecting unit of the first electronic device and the wireless connecting unit of the secondary electronic device respectively have a peripheral mode and a central mode. The first electronic device broadcasts the specific signal in the peripheral mode, and the secondary electronic device receives the specific signal in the central mode.

In some embodiments, the first electronic device further records the time when the specific signal is generated, the time when the specific signal is stopped generating in response to the connection of the secondary electronic device, and/or identification data corresponding to the secondary electronic device. In some embodiments, the first electronic device further receives a connection of a third electronic device via a wireless network, and transmits the time when the specific signal is generated, the time when the specific signal stops generating in response to the connection of the secondary electronic device, and/or the identification data corresponding to the secondary electronic device to the third electronic device via the wireless network.

In some embodiments, the secondary electronic device further records the time when the specific signal is received, the time when the secondary electronic device connects to the first electronic device, and/or identification data corresponding to the first electronic device. In some embodiments, the secondary electronic device further receives a connection of a third electronic device via a wireless network, and transmits the time when the specific signal is received, the time when the secondary electronic device connects to the first electronic device, and/or the identification data corresponding to the first electronic device to the third electronic device via the wireless network.

In some embodiments, the specific signal comprises identification data corresponding to the first electronic device, and the secondary electronic device further displays the identification data via a display unit. When a selection corresponding to the identification data is received by the secondary electronic device, the secondary electronic device automatically connects to the first electronic device via a wireless network according to the identification data.

In some embodiments, it is determined whether the secondary electronic device connects to the first electronic device via a wireless network in a predefined period after the specific signal is received by the secondary electronic device. When the secondary electronic device does not connect to the first electronic device via a wireless network in the predefined period, a prompt is generated via the secondary electronic device.

In some embodiments, it is determined whether the secondary electronic device continuously receives the specific signal via the wireless network. When the secondary electronic device does not continuously receive the specific signal via the wireless network, the specific signal in the secondary electronic device is deleted, or the specific signal is noted.

In an embodiment of a method for transmitting signals between electronic devices, the motion of the first electronic device is detected using at least one motion sensor, and an instruction is generated according to the motion. The first electronic device generates a specific signal according to the instruction, and broadcasts the specific signal via a wireless network using a wireless connecting unit. Then, at least one secondary electronic device receives the specific signal via a wireless network using a wireless connecting unit. The wireless connecting unit of the first electronic device and the wireless connecting unit of the secondary electronic device respectively have a peripheral mode and a central mode. The first electronic device broadcasts the specific signal in the peripheral mode, and the secondary electronic device receives the specific signal in the central mode.

An embodiment of a system for transmitting signals between electronic devices comprises a first electronic device and at least one secondary electronic device. At least one motion sensor of the first electronic device detects the motion of the first electronic device to generate an instruction. The first electronic device generates a specific signal according to the instruction, and broadcasts the specific signal via a wireless network using a wireless connecting unit. The secondary electronic device receives the specific signal via a wireless network using a wireless connecting unit. The wireless connecting unit of the first electronic device and the wireless connecting unit of the secondary electronic device respectively have a peripheral mode and a central mode. The first electronic device broadcasts the specific signal in the peripheral mode, and the secondary electronic device receives the specific signal in the central mode.

Methods for transmitting signals between electronic devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for transmitting signals between electronic devices are provided.

Figure 1:
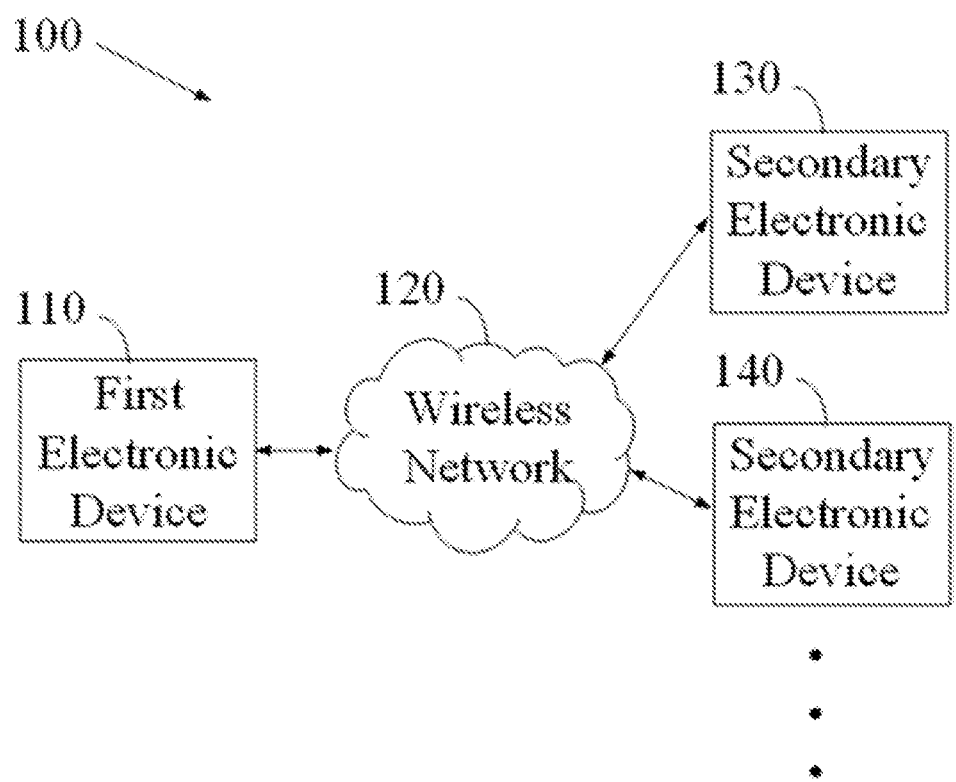
FIG. 1 is a schematic diagram illustrating an embodiment of a system for transmitting signals between electronic devices of the invention.

FIG. 1 is a schematic diagram illustrating an embodiment of a system for transmitting signals between electronic devices of the invention. The system for transmitting signals between electronic devices 100 comprises a first electronic device 110 and at least one secondary electronic device (130 and 140). The first electronic device 110 and the secondary electronic device can be any electronic device having wireless connecting capabilities. The first electronic device 110 can transmit signals via a wireless network 120, and the respective secondary electronic device can receive the signals transmitted by the first electronic device 110 via the wireless network 120.

Figure 2:
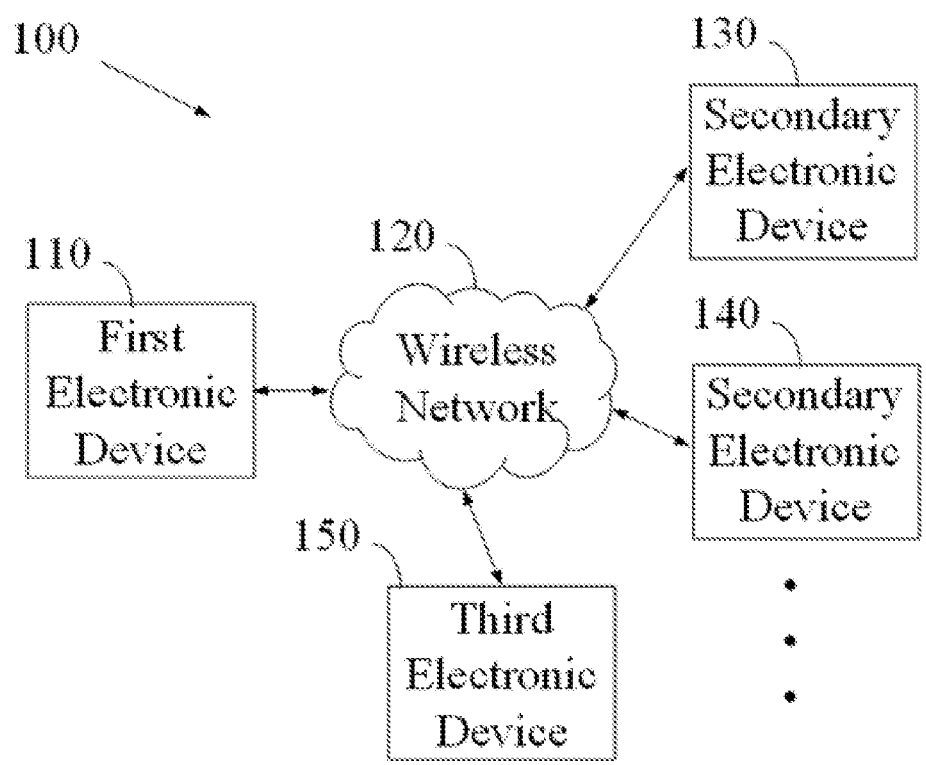
FIG. 2 is a schematic diagram illustrating another embodiment of a system for transmitting signals between electronic devices of the invention.

FIG. 2 is a schematic diagram illustrating another embodiment of a system for transmitting signals between electronic devices of the invention. The system for transmitting signals between electronic devices 100 comprises a first electronic device 110, at least one secondary electronic device (130 and 140), and a third electronic device 150. Similarly, the first electronic device 110 and the secondary electronic device can be any electronic device having wireless connecting capabilities. The third electronic device 150 may be a portable device, such as a smart phone, a PDA (Personal Digital Assistant), or a tablet computer. The first electronic device 110 can transmit signals via a wireless network 120, and the respective secondary electronic device can receive the signals transmitted by the first electronic device 110 via the wireless network 120. The third electronic device 150 can respectively connect to the first electronic device 110 and secondary electronic device to receive related data via the wireless network 120.

Figure 3:
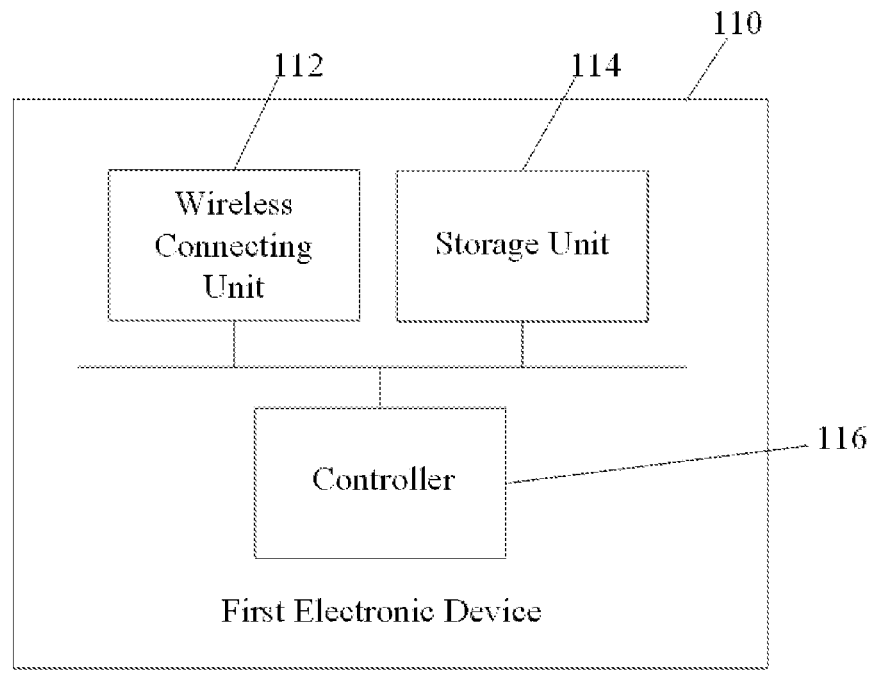
FIG. 3 is a schematic diagram illustrating an embodiment of a first electronic device of the invention.

FIG. 3 is a schematic diagram illustrating an embodiment of a first electronic device of the invention. As shown in FIG. 3, the first electronic device 110 comprises a wireless connecting unit 112, a storage unit 114, and a controller 116. The wireless connecting unit 112 can connect to other electronic devices having wireless connecting capabilities via a wireless network, such as Wi-Fi or Bluetooth network. It is understood that, in some embodiments, the wireless connecting unit 112 may be a wireless connecting unit implemented with a low-power consumption technology, such as Bluetooth Smart technology. The wireless connecting unit 112 has two modes, such as a central mode and a peripheral mode. In the peripheral mode, the wireless connecting unit 112 can broadcast signals, such as its identification data. In the central mode, the wireless connecting unit 112 can receive data from the wireless connecting units of other electronic devices. The storage unit 114 can store related data, such as time stamps corresponding to the occurrence of specific events. The controller 116 can control related operations of hardware and software in the first electronic device 110. It is understood that, in some embodiments, the first electronic device 110 can further comprise at least one physical key. When the physical key is pressed, the controller 116 will generate a signal, and broadcast the signal via the wireless connecting unit 112.

Figure 4:
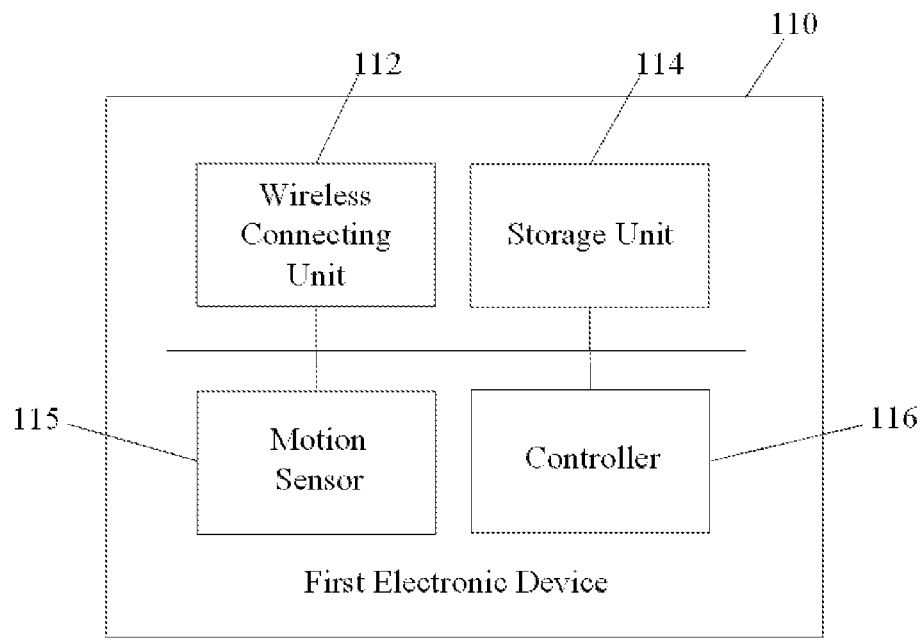
FIG. 4 is a schematic diagram illustrating another embodiment of a first electronic device of the invention.

FIG. 4 is a schematic diagram illustrating another embodiment of a first electronic device of the invention. As shown in FIG. 4, the first electronic device 110 comprises a wireless connecting unit 112, a storage unit 114, a motion sensor 115, and a controller 116. The wireless connecting unit 112 can connect to other electronic devices having wireless connecting capabilities via a wireless network, such as Wi-Fi or Bluetooth network. Similarly, in some embodiments, the wireless connecting unit 112 may be a wireless connecting unit implemented with a low-power consumption technology, such as Bluetooth Smart technology. The wireless connecting unit 112 has two modes, specifically a central mode and a peripheral mode. In the peripheral mode, the wireless connecting unit 112 can broadcast signals, such as its identification data. In the central mode, the wireless connecting unit 112 can receive data from the wireless connecting units of other electronic devices. The storage unit 114 can store related data, such as time stamps corresponding to the occurrence of specific events. The motion sensor 115 can detect the motion of the first electronic device 110. It is understood that, in some embodiments, the motion sensor may be an accelerometer such as a G-sensor for generating information of velocity and displacement when the device moves. In some embodiments, the motion sensor may be a Gyro sensor for generating information of angular acceleration when the device moves. It is noted that, the above motion sensors are only examples of the present application, and the present invention is not limited thereto. Any motion sensor that can determine whether the wearable electronic device has moved can be applied in the present invention. The controller 116 can control related operations of hardware and software in the first electronic device 110. The controller 116 can generate a signal according to the motion detected by the motion sensor, and broadcast the signal via the wireless connecting unit 112.

Figure 5:
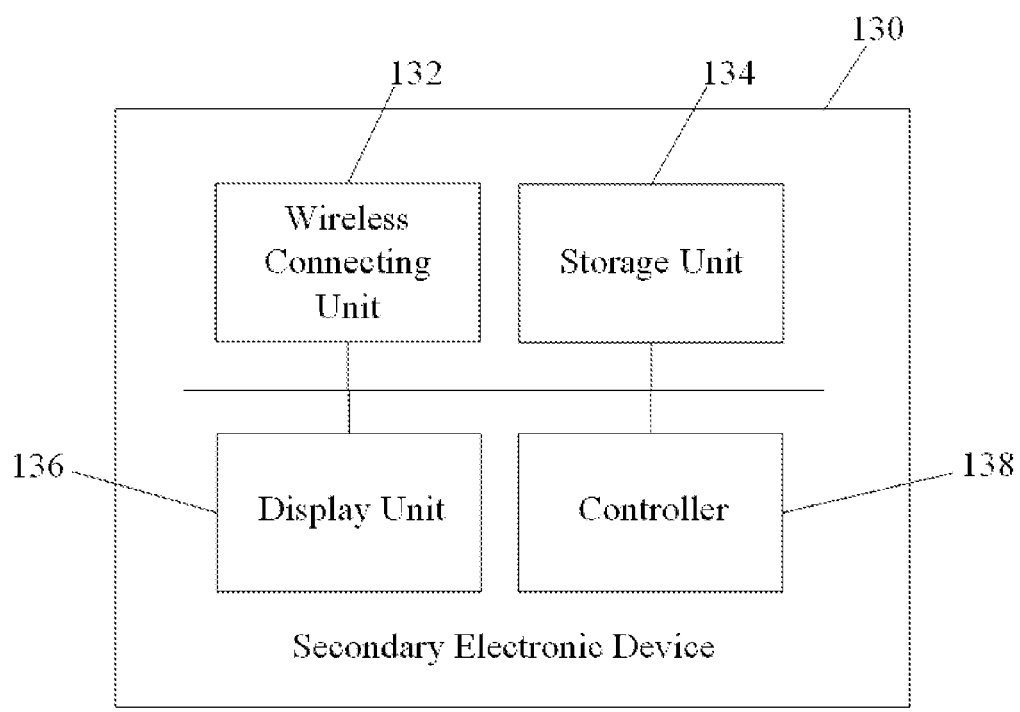
FIG. 5 is a schematic diagram illustrating an embodiment of a secondary electronic device of the invention.

FIG. 5 is a schematic diagram illustrating an embodiment of a secondary electronic device of the invention. As shown in FIG. 5, the secondary electronic device 130 comprises a wireless connecting unit 132, a storage unit 134, a display unit 136, and a controller 138. The wireless connecting unit 132 can connect to other electronic devices having wireless connecting capabilities via a wireless network, such as Wi-Fi or Bluetooth network. Similarly, in some embodiments, the wireless connecting unit 132 may be a wireless connecting unit implemented with a low-power consumption technology, such as Bluetooth Smart technology. The wireless connecting unit 132 has two modes, specifically a central mode and a peripheral mode. In the peripheral mode, the wireless connecting unit 132 can broadcast signals, such as its identification data. In the central mode, the wireless connecting unit 132 can receive data from the wireless connecting units of other electronic devices. The storage unit 134 can store related data, such as time stamps corresponding to the occurrence of specific events. The display unit 136 can display related information, such as texts, images, and interfaces. The controller 138 can control related operations of hardware and software in the secondary electronic device 130. It is understood that, in some embodiments, the secondary electronic device 130 can further comprise a sound output unit (not shown in FIG. 5) for generating sounds. In some embodiments, the secondary electronic device 130 can further comprise a vibration unit (not shown in FIG. 5) for generating vibrations.

Figure 6:
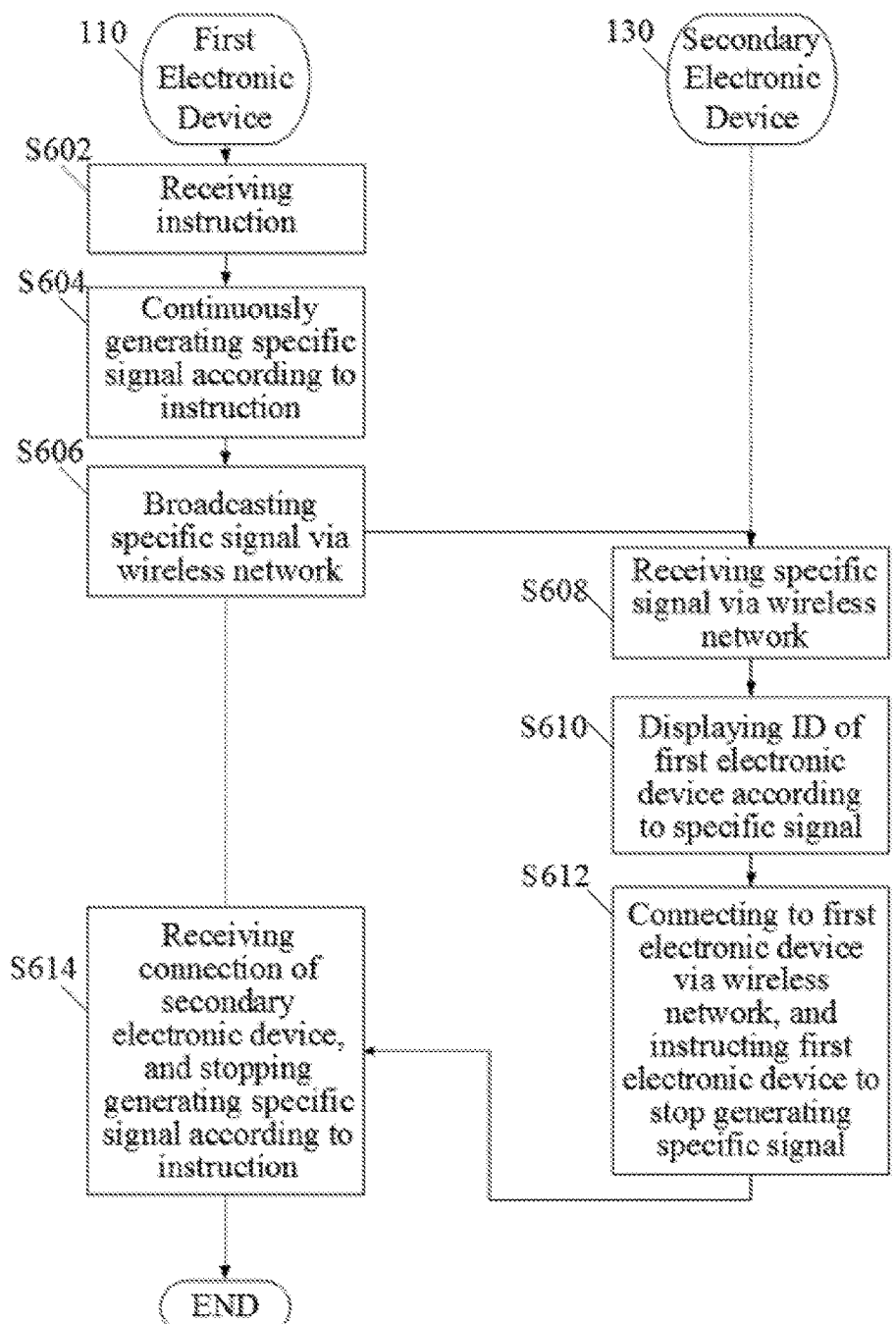
FIG. 6 is a flowchart of an embodiment of a method for transmitting signals between electronic devices of the invention.

FIG. 6 is a flowchart of an embodiment of a method for transmitting signals between electronic devices of the invention. The method for transmitting signals between electronic devices can be used in at least two electronic devices having wireless connecting capabilities, such as the first electronic device 110 and the secondary electronic device 130 in FIG. 1 or FIG. 2. It is understood that, in the embodiment, in addition to receiving signals broadcasted by the first electronic device via a wireless network, the secondary electronic device 130 can connect to the first electronic device 110, and instruct the first electronic device 110 to stop generating signals.

In step S602, a first electronic device 110 receives an instruction. It is understood that, in some embodiments, the first electronic device 110 can have at least one key. When the physical key is pressed, an instruction is generated. In some embodiments, the first electronic device 110 can have at least one motion sensor for detecting the motion of the first electronic device 110. When a specific motion is detected by the motion sensor, an instruction is generated. When the first electronic device 110 receives the instruction, in step S604, a specific signal is continuously generated according to the instruction, and in step S606, the specific signal is broadcasted via a wireless network using a wireless connecting unit by the first electronic device 110. It is understood that, in some embodiments, the wireless connecting unit may be a wireless connecting unit implemented with a low-power consumption technology, such as Bluetooth Smart technology. The wireless connecting unit has two modes, specifically a central mode and a peripheral mode. In the peripheral mode, the wireless connecting unit can broadcast the specific signal via a wireless network. It is understood that, in some embodiments, the specific signal can comprise identification data corresponding to the first electronic device 110. In some embodiments, the specific signal can comprise auxiliary data, such as a service type of a request. Then, in step S608, at least one secondary electronic device 130 receives the specific signal broadcasted by the first electronic device 110 via a wireless network using a wireless connecting unit. It is understood that, in some embodiments, the wireless connecting unit of the secondary electronic device 130 has two modes, such as a central mode and a peripheral mode. The secondary electronic device 130 receives the specific signal via the wireless network in the central mode. It is noted that, in some embodiments, any device (secondary electronic device) within a predefined coverage of the first electronic device 110 will receive the specific signal broadcasted by the first electronic device 110. In some embodiments, a specific process can be performed between the first electronic device 110 and at least one secondary electronic device, such that the identification data of the first electronic device 110 can be registered in the secondary electronic device. In some embodiments, the secondary electronic device 130 can determine whether the identification data recorded in the specific signal is the registered identification data. When the identification data recorded in the specific signal is the registered identification data, the procedure goes to step S610. In step S610, the secondary electronic device 130 displays the identification data corresponding to the first electronic device 110 via a display unit according to the received signal. It is understood that, in some embodiments, the secondary electronic device 130 can generate vibrations via a vibration unit, thus prompting the reception of the specific signal. In step S612, the secondary electronic device 130 connects to the first electronic device 110 via a wireless network, and instructs the first electronic device 110 to stop generating the specific signal. In the meantime, in step S614, the first electronic device 110 receives the connection of the secondary electronic device 130 via the wireless network, and stops generating the specific signal according to the instruction from the secondary electronic device 130. As described, the secondary electronic device 130 can display the identification data corresponding to the first electronic device 110. In some embodiments, when a selection corresponding to the identification data of the first electronic device 110 is received by the secondary electronic device 130, the secondary electronic device 130 will automatically connect to the first electronic device 110 via a wireless network according to the identification data.

Figure 7:
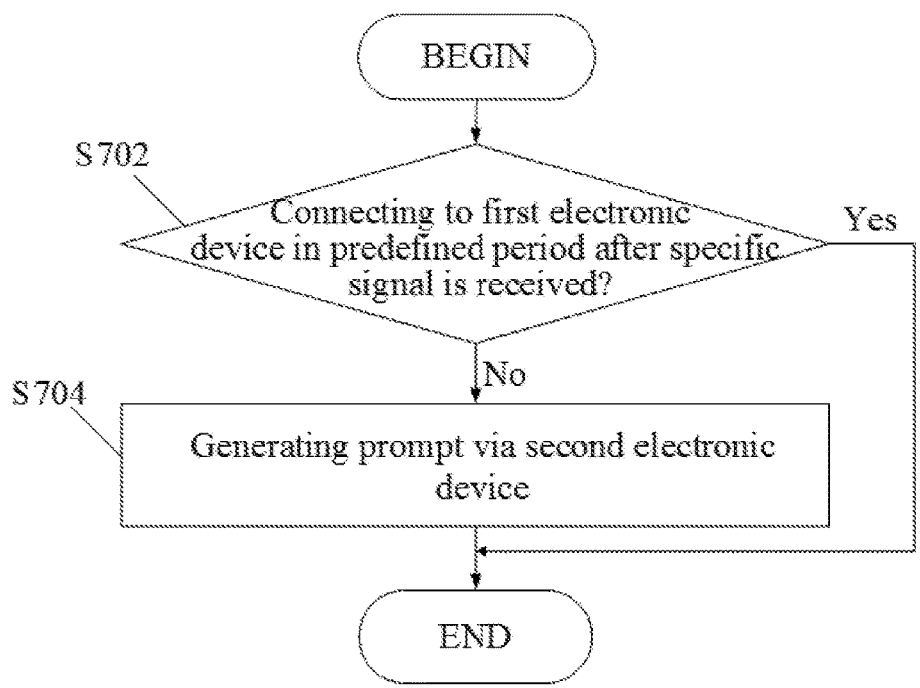
FIG. 7 is a flowchart of another embodiment of a method for transmitting signals between electronic devices of the invention.
Figure 8:
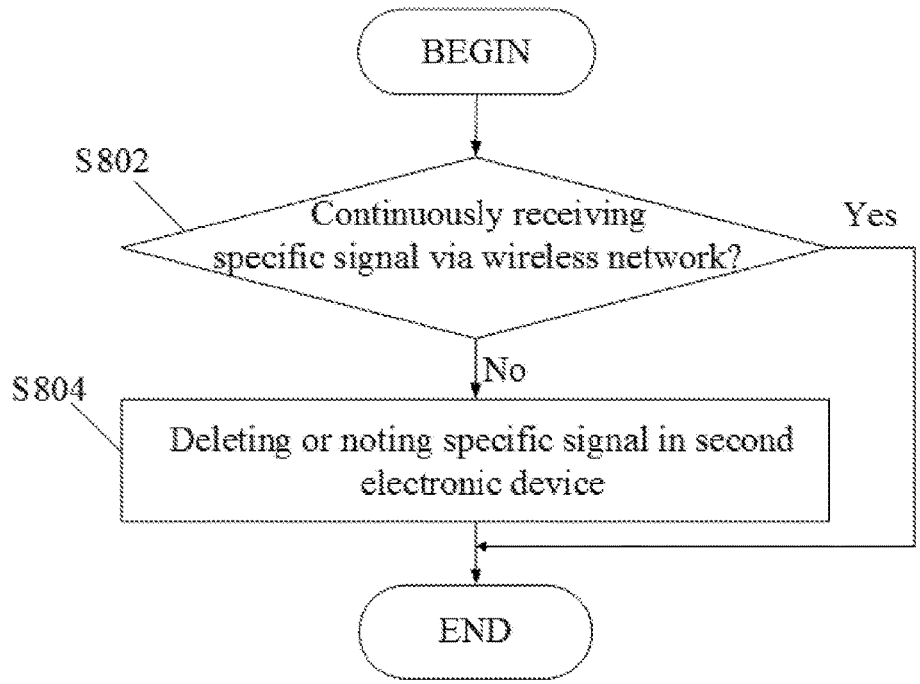
FIG. 8 is a flowchart of another embodiment of a method for transmitting signals between electronic devices of the invention.

It is understood that in some embodiments, related management mechanisms are provided to ensure that the service request (specific signal) of the first electronic device will not be ignored or repeatedly handled by the secondary electronic device. FIG. 7 is a flowchart of another embodiment of a method for transmitting signals between electronic devices of the invention. In step S702, it is determined whether the secondary electronic device 130 connects to the first electronic device 110 via a wireless network in a predefined period after the specific signal is received by the secondary electronic device 130. When the secondary electronic device 130 connects to the first electronic device 110 via a wireless network in the predefined period (Yes in step S702), the procedure is completed. When the secondary electronic device 130 does not connect to the first electronic device 110 via a wireless network in the predefined period (No in step S702), in step S704, a prompt, such as a sound, a vibration, or a display of a message is generated via the secondary electronic device 130. FIG. 8 is a flowchart of another embodiment of a method for transmitting signals between electronic devices of the invention. In step S802, it is determined whether the secondary electronic device 130 continuously receives the specific signal via the wireless network. When the secondary electronic device 130 continuously receives the specific signal via the wireless network (Yes in step S802), the procedure is completed. When the secondary electronic device 130 does not continuously receive the specific signal via the wireless network (No in step S802), in step S804, the specific signal in the secondary electronic device 130 is deleted, or the specific signal is noted. For example, the specific signal can be noted as a task which has been handled.

Figure 9:
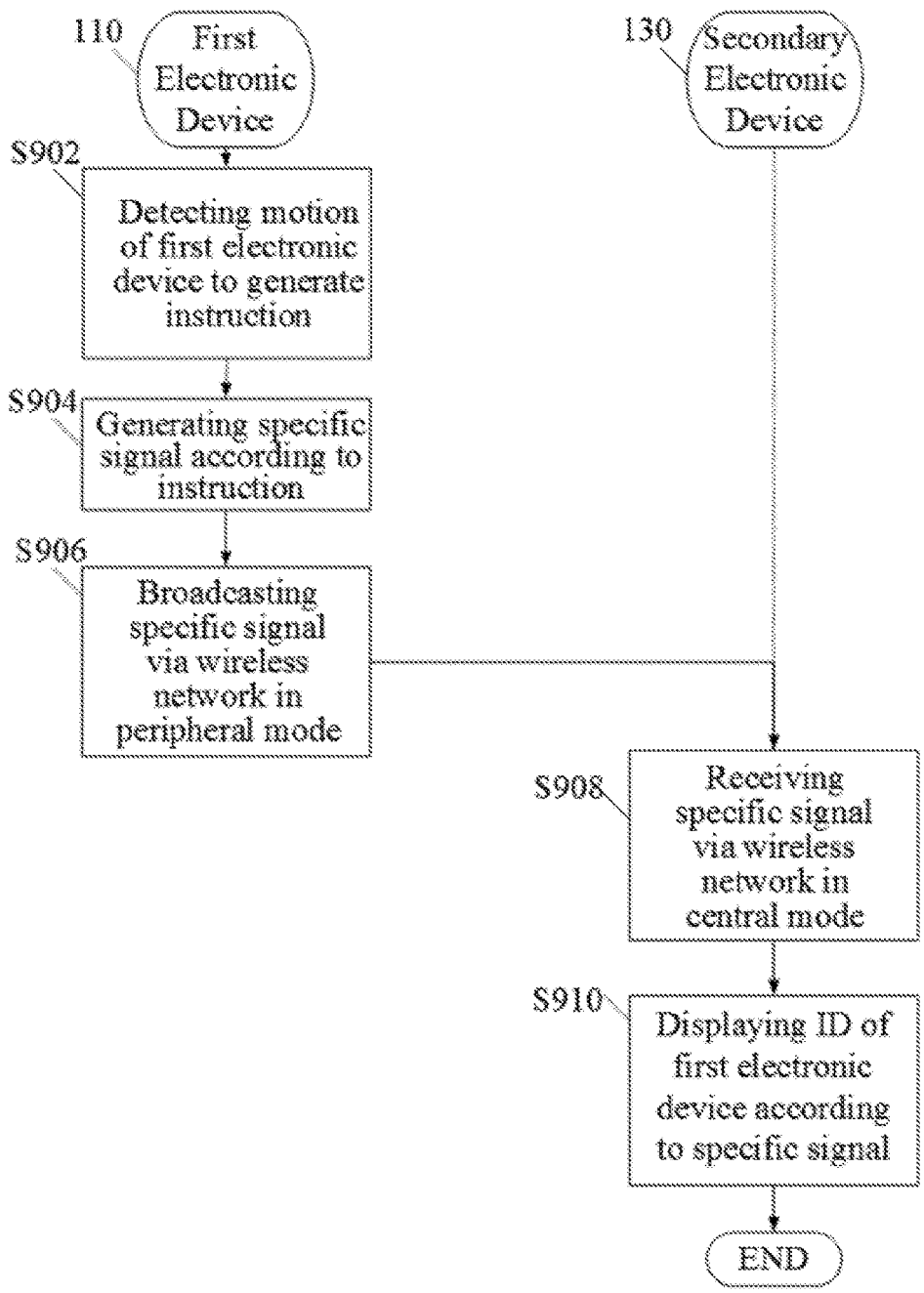
FIG. 9 is a flowchart of another embodiment of a method for transmitting signals between electronic devices of the invention.

FIG. 9 is a flowchart of another embodiment of a method for transmitting signals between electronic devices of the invention. The method for transmitting signals between electronic devices can be used in at least two electronic devices having wireless connecting capabilities, such as the first electronic device 110 and the secondary electronic device 130 in FIG. 1 or FIG. 2. It is understood that, in the embodiment, the first electronic device generate a specific signal according to its motion.

In step S902, at least one motion sensor of the first electronic device 110 detects the motion of the first electronic device 110 to generate an instruction. It is understood that, in some embodiments, the motion sensor may be an accelerometer such as a G-sensor for generating information of velocity and displacement when the device moves. In some embodiments, the motion sensor may be a Gyro sensor for generating information of angular acceleration when the device moves. It is noted that, the above motion sensors are only examples of the present application, and the present invention is not limited thereto. Any motion sensor that can determine whether the wearable electronic device has moved can be applied in the present invention. It is noted that, when a specific motion is detected by the motion sensor, the instruction is generated. In step S904, the first electronic device 110 generates a specific signal according to the instruction, and in step S906, broadcasts the signal via a wireless network using a wireless connecting unit in a peripheral mode. It is noted that the wireless connecting unit may be a wireless connecting unit implemented with a low-power consumption technology, such as Bluetooth Smart technology. The wireless connecting unit has two modes, specifically a central mode and a peripheral mode. It is understood that, in some embodiments, the specific signal can comprise identification data corresponding to the first electronic device. In some embodiments, the specific signal can comprise auxiliary data, such as a service type of a request. Then, in step S908, at least one secondary electronic device 130 receives the specific signal broadcasted by the first electronic device 110 via a wireless network using a wireless connecting unit in the central mode. Similarly, the wireless connecting unit of the secondary electronic device 130 has a central mode and a peripheral mode. It is noted that, in some embodiments, any device (secondary electronic device) within a predefined coverage of the first electronic device 110 will receive the specific signal broadcasted by the first electronic device 110. In some embodiments, a specific process can be performed between the first electronic device 110 and the at least one secondary electronic device, so that the identification data of the first electronic device 110 can be registered in the secondary electronic device. In some embodiments, the secondary electronic device 130 can determine whether the identification data recorded in the specific signal is the registered identification data. When the identification data recorded in the specific signal is the registered identification data, the procedure goes to step S910. In step S910, the secondary electronic device 130 displays the identification data corresponding to the first electronic device 110 via a display unit according to the received signal. It is understood that, in some embodiments, the secondary electronic device 130 can generate vibrations via a vibration unit, thus prompting the reception of the specific signal.

In the present application, related tools can be provided to record and gather statistics regarding execution details of the provided services.

Figure 10:
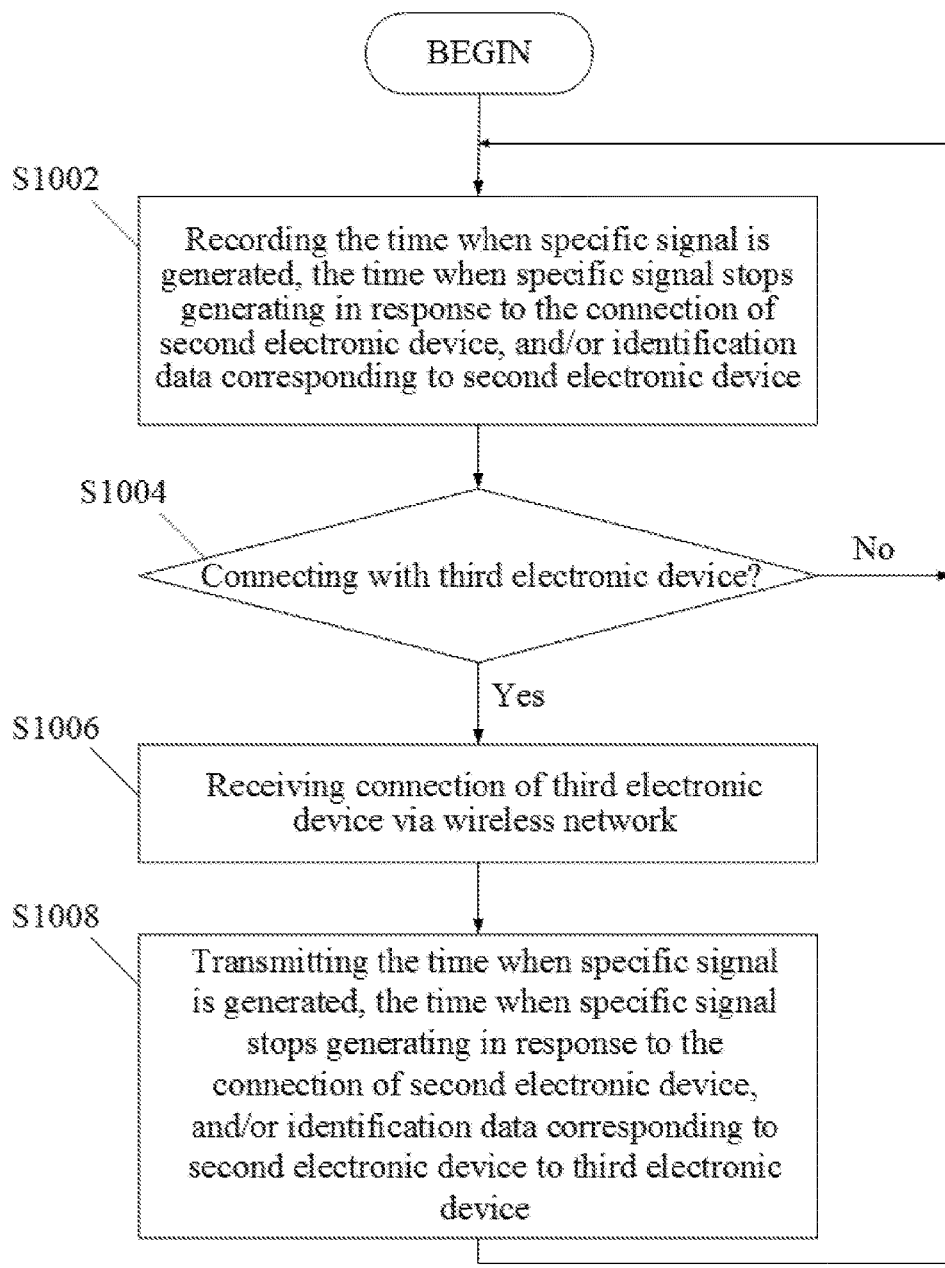
FIG. 10 is a flowchart of another embodiment of a method for transmitting signals between electronic devices of the invention.

FIG. 10 is a flowchart of another embodiment of a method for transmitting signals between electronic devices of the invention. The method for transmitting signals between electronic devices can be used in the first electronic device 110 in FIG. 2. In step S1002, the first electronic device 110 records the time when the specific signal is generated, the time when the specific signal stops generating in response to the connection of the secondary electronic device 130, and/or identification data corresponding to the secondary electronic device 130. In step S1004, it is determined whether a connection request is received from a third electronic device 150. When a connection request is not received from the third electronic device 150 (No in step S1004), the procedure returns to step S1002. When a connection request is received from the third electronic device 150 (Yes in step S1004), in step S1006, the first electronic device 110 receives the connection of the third electronic device 150 via a wireless network, and in step S1008, transmits the time when the specific signal is generated, the time when the specific signal stops generating in response to the connection of the secondary electronic device 130, and/or identification data corresponding to the secondary electronic device 130 to the third electronic device 150 via the wireless network. Then, the procedure returns to step S1002.

Figure 11:
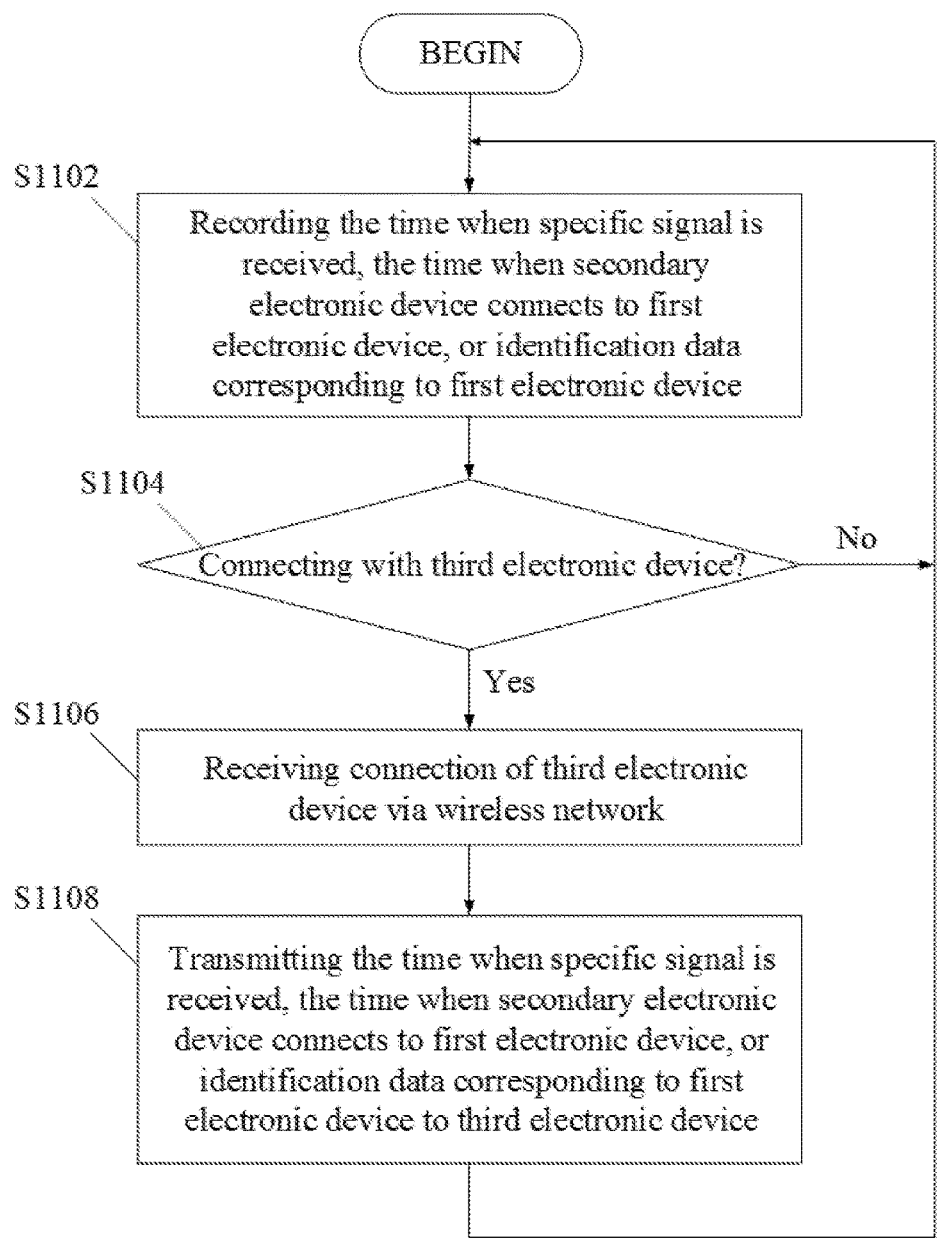
FIG. 11 is a flowchart of another embodiment of a method for transmitting signals between electronic devices of the invention.

FIG. 11 is a flowchart of another embodiment of a method for transmitting signals between electronic devices of the invention. The method for transmitting signals between electronic devices can be used in the secondary electronic device 130 in FIG. 2. In step S1102, the secondary electronic device 130 records the time when the specific signal is received, the time when the secondary electronic device 130 connects to the first electronic device 110, and/or identification data corresponding to the first electronic device 110. In step S1104, it is determined whether a connection request is received from a third electronic device 150. When a connection request is not received from the third electronic device 150 (No in step S1104), the procedure returns to step S1102. When a connection request is received from the third electronic device 150 (Yes in step S1104), in step S1106, the secondary electronic device 130 receives the connection of the third electronic device 150 via a wireless network, and in step S1108, transmits the time when the specific signal is received, the time when the secondary electronic device 130 connects to the first electronic device 110, and/or identification data corresponding to the first electronic device 110 to the third electronic device 150 via the wireless network. Then, the procedure returns to step S1102.

For example, a first electronic device can be set on a table of a restaurant, and one or more waiters can wear a secondary electronic device on their wrists. When a customer needs a service, the customer can easily and elegantly complete a procedure for service request by pressing a key of the first electronic device or by gently shaking the first electronic device, thus driving the first electronic device to generate and broadcast a specific signal via a wireless network. The secondary electronic device worn on the wrist of the waiter within a predefined coverage can receive the broadcasted specific signal via the wireless network, so that the waiter will know which table requests services and provides services in real-time. Before or after the waiter provides the services, the waiter can easily select the identification data displayed by the secondary electronic device, so that the secondary electronic device automatically connects to the first electronic device generating the specific signal, and instructs the first electronic device to stop generating the specific signal. When the waiter ignores the specific signal received by the secondary electronic device, that is the waiter does not provide services in real-time, the secondary electronic device will generate a prompt to notify the waiter after a predefined period. After one of the waiters completes the service, the other secondary electronic devices that also receive the specific signal will note the specific signal as a task which has been handled since the specific signal transmitted by the first electronic device cannot be continuously received, so that the case where several waiters simultaneously provide services to the same customer will not occur. After the open hour of the restaurant, or at any moment, a smart phone or a tablet computer (third electronic device) can respectively connect to the respective first electronic device and the respective secondary electronic device via a wireless network, and obtain related service data for subsequent analysis.

In another example, a first electronic device can be set on the respective table of a restaurant, and at least one secondary electronic device, such as a smart phone or a tablet computer can be set in a specific position in the restaurant. Additionally, one or more waiter can respectively wear a wearable electronic device on the wrist. When a customer needs a service, the customer can press a key on the first electronic device or gently shake the first electronic device, thus driving the first electronic device to generate and broadcast a specific signal via a wireless network. The secondary electronic device can receive the broadcasted specific signal via the wireless network, and transmits the specific signal and/or related information regarding the specific signal to the wearable electronic device worn on the wrist of the waiter via a wireless network. After the wearable electronic device receives the specific signal, the waiter will know which table requests services and provides the services in real-time. Before or after the waiter provides the services, the wearable electronic device can transmit an instruction to the secondary electronic device, so that the secondary electronic device automatically connects to the first electronic device generating the specific signal, and instructs the first electronic device to stop generating the specific signal. Similarly, when the waiter ignores the specific signal received by the wearable electronic device, that is the waiter does not provide services in real-time, the secondary electronic device or the wearable electronic device will generate a prompt to notify the waiter after a predefined period. After one of the waiters completes the service, other wearable electronic devices that also receive the specific signal will note the specific signal as a task which has been handled since the specific signal transmitted by the first electronic device cannot be continuously received, so that the case where several waiters simultaneously provide services to the same customer will not occur. It is noted that, the example in a restaurant is only an example of the present application, and the present invention is not limited thereto. The present invention can be used in any place, such as a restaurant, hospital, school, store, sports course, factory, or house.

Therefore, the methods and systems for transmitting signals between electronic devices of the present invention can transmit signals between electronic devices by wirelessly broadcasting the signals, and optionally generate signals according to the motion of an electronic device or instruct the electronic device to stop generating signals via another electronic device, thereby reducing the instability of conventional signal transmission technology, and providing effective tools for evaluating the effects of related execution details.

Methods for transmitting signals between electronic devices may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for transmitting signals between electronic devices, comprising:
   receiving an instruction, and continuously generating a specific signal according to the instruction by a first electronic device;
   broadcasting the specific signal via a wireless network using a wireless connecting unit by the first electronic device;
   receiving the specific signal via a wireless network using a wireless connecting unit by at least one secondary electronic device; and
   connecting to the first electronic device via a wireless network, and instructing the first electronic device to stop generating the specific signal by the secondary electronic device,
   wherein the first electronic device records the time when the specific signal is generated, the time when the specific signal is stopped generating in response to the connection of the secondary electronic device, or identification data corresponding to the secondary electronic device, and the first electronic device receives a connection of a third electronic device via a wireless network, and transmits the time when the specific signal is generated, the time when the specific signal is stopped generating in response to the connection of the secondary electronic device, or the identification data corresponding to the secondary electronic device to the third electronic device via the wireless network.

2. The method of claim 1, wherein the first electronic device comprises at least one motion sensor for detecting the motion of the first electronic device to generate the instruction.

3. The method of claim 1, wherein the wireless connecting unit of the first electronic device and the wireless connecting unit of the secondary electronic device respectively have a peripheral mode and a central mode, the first electronic device broadcasts the specific signal in the peripheral mode, and the secondary electronic device receives the specific signal in the central mode.

4. The method of claim 1, wherein the secondary electronic device further records the time when the specific signal is received, the time when the secondary electronic device connects to the first electronic device, or identification data corresponding to the first electronic device.

5. The method of claim 4, wherein the secondary electronic device further receives a connection of a third electronic device via a wireless network, and transmits the time when the specific signal is received, the time when the secondary electronic device connects to the first electronic device, or the identification data corresponding to the first electronic device to the third electronic device via the wireless network.

6. The method of claim 1, wherein the specific signal comprises identification data corresponding to the first electronic device, and the secondary electronic device further displays the identification data via a display unit, and the secondary electronic device automatically connects to the first electronic device via a wireless network according to the identification data when a selection corresponding to the identification data is received by the secondary electronic device.

7. The method of claim 1, further comprising determining whether the secondary electronic device connects to the first electronic device via a wireless network in a predefined period after the specific signal is received by the secondary electronic device, and generating a prompt via the secondary electronic device when the secondary electronic device does not connect to the first electronic device via a wireless network in the predefined period.

8. The method of claim 1, further comprising determining whether the secondary electronic device continuously receives the specific signal via the wireless network, and deleting or noting the specific signal in the secondary electronic device when the secondary electronic device does not continuously receive the specific signal via the wireless network.

9. A system for transmitting signals between electronic devices, comprising:
   a first electronic device receiving an instruction, continuously generating a specific signal according to the instruction by a first electronic device, and broadcasting the specific signal via a wireless network using a wireless connecting unit; and
   at least one secondary electronic device receiving the specific signal via a wireless network using a wireless connecting unit, connecting to the first electronic device via a wireless network, and instructing the first electronic device to stop generating the specific signal,
   wherein the first electronic device records the time when the specific signal is generated, the time when the specific signal is stopped generating in response to the connection of the secondary electronic device, or identification data corresponding to the secondary electronic device, and the first electronic device receives a connection of a third electronic device via a wireless network, and transmits the time when the specific signal is generated, the time when the specific signal is stopped generating in response to the connection of the secondary electronic device, or the identification data corresponding to the secondary electronic device to the third electronic device via the wireless network.

10. A method for transmitting signals between electronic devices, comprising:
receiving an instruction, and continuously generating a specific signal according to the instruction by a first electronic device;
broadcasting the specific signal via a wireless network using a wireless connecting unit by the first electronic device;
receiving the specific signal via a wireless network using a wireless connecting unit by at least one secondary electronic device; and
connecting to the first electronic device via a wireless network, and instructing the first electronic device to stop generating the specific signal by the secondary electronic device,
wherein the secondary electronic device records the time when the specific signal is received, the time when the secondary electronic device connects to the first electronic device, or identification data corresponding to the first electronic device, and the secondary electronic device receives a connection of a third electronic device via a wireless network, and transmits the time when the specific signal is received, the time when the secondary electronic device connects to the first electronic device, or the identification data corresponding to the first electronic device to the third electronic device via the wireless network.

11. The method of claim 10, wherein the specific signal comprises identification data corresponding to the first electronic device, and the secondary electronic device further displays the identification data via a display unit, and the secondary electronic device automatically connects to the first electronic device via a wireless network according to the identification data when a selection corresponding to the identification data is received by the secondary electronic device.

12. The method of claim 10, further comprising determining whether the secondary electronic device connects to the first electronic device via a wireless network in a predefined period after the specific signal is received by the secondary electronic device, and generating a prompt via the secondary electronic device when the secondary electronic device does not connect to the first electronic device via a wireless network in the predefined period.

13. The method of claim 10, further comprising determining whether the secondary electronic device continuously receives the specific signal via the wireless network, and deleting or noting the specific signal in the secondary electronic device when the secondary electronic device does not continuously receive the specific signal via the wireless network.

14. A system for transmitting signals between electronic devices, comprising:
a first electronic device receiving an instruction, continuously generating a specific signal according to the instruction by a first electronic device, and broadcasting the specific signal via a wireless network using a wireless connecting unit; and
at least one secondary electronic device receiving the specific signal via a wireless network using a wireless connecting unit, connecting to the first electronic device via a wireless network, and instructing the first electronic device to stop generating the specific signal,
wherein the secondary electronic device records the time when the specific signal is received, the time when the secondary electronic device connects to the first electronic device, or identification data corresponding to the first electronic device, and the secondary electronic device receives a connection of a third electronic device via a wireless network, and transmits the time when the specific signal is received, the time when the secondary electronic device connects to the first electronic device, or the identification data corresponding to the first electronic device to the third electronic device via the wireless network.

* * * * *